United States Patent
Sharpe

(10) Patent No.: US 7,563,418 B2
(45) Date of Patent: Jul. 21, 2009

(54) HYDROGEN GAS GENERATOR FOR JET ENGINES

(76) Inventor: Thomas H. Sharpe, 55 Dorr Dr., North Augusta, SC (US) 29841

( * ) Notice: Subject to any disclaimer, the term of this patent is extended or adjusted under 35 U.S.C. 154(b) by 0 days.

(21) Appl. No.: 12/219,805

(22) Filed: Jul. 29, 2008

(65) Prior Publication Data
US 2009/0145763 A1 Jun. 11, 2009

Related U.S. Application Data

(60) Provisional application No. 60/996,780, filed on Dec. 5, 2007.

(51) Int. Cl.
*B01J 15/00* (2006.01)
*C25B 9/00* (2006.01)
*C01B 3/10* (2006.01)
*C25B 1/04* (2006.01)

(52) U.S. Cl. .................. 422/199; 422/236; 423/657; 423/658; 204/272

(58) Field of Classification Search .................. 204/272
See application file for complete search history.

(56) References Cited

U.S. PATENT DOCUMENTS

| | | | | |
|---|---|---|---|---|
| 4,113,589 A | * | 9/1978 | Leach | 204/157.5 |
| 4,148,701 A | * | 4/1979 | Leach | 204/157.5 |
| 4,371,500 A | * | 2/1983 | Papineau | 422/115 |
| 4,490,349 A | * | 12/1984 | Horvath | 423/657 |
| 4,547,356 A | * | 10/1985 | Papineau | 423/658 |
| 4,569,389 A | | 2/1986 | Graham | |
| 5,085,176 A | * | 2/1992 | Brinkley, III | 123/3 |
| 5,788,820 A | * | 8/1998 | Liu | 204/212 |
| 6,267,855 B1 | * | 7/2001 | Watanabe et al. | 204/272 |
| 6,790,324 B2 | * | 9/2004 | Chambers | 204/242 |
| 7,291,255 B2 | * | 11/2007 | Fujimura et al. | 205/637 |
| 7,491,309 B2 | * | 2/2009 | Peter et al. | 205/629 |
| 2004/0124095 A1 | * | 7/2004 | Fujimura et al. | 205/629 |
| 2005/0160735 A1 | | 7/2005 | Nelson et al. | |

FOREIGN PATENT DOCUMENTS

JP 8109002 4/1996

* cited by examiner

*Primary Examiner*—Harry D Wilkins, III
(74) *Attorney, Agent, or Firm*—Richard C. Litman

(57) ABSTRACT

A hydrogen gas generator for jet engines includes a device that utilizes photons and a catalyst to disassociate hydrogen gas from water. The generated hydrogen gas is directed to the combustion chamber of a jet engine and combined with air therein for burning and powering the jet engine. The device is connected to a source of electric energy and pressurized water. The electric energy is supplied to an anode and a surrounding cathode. The cathode is designed to glow white-hot and emit photons and heat when an electric current is supplied thereto. The anode is fabricated from a catalytic material and is designed to become red-hot when supplied with electric energy. Water is supplied through a conduit and is converted to superheated steam, which is thermolytically decomposed to form hydrogen and oxygen.

13 Claims, 3 Drawing Sheets

US 7,563,418 B2

HYDROGEN GAS GENERATOR FOR JET ENGINES

CROSS-REFERENCE TO RELATED APPLICATION

This application claims the benefit of U.S. Provisional Patent Application Ser. No. 60/996,780, filed Dec. 5, 2007.

BACKGROUND OF THE INVENTION

1. Field of the Invention

The present invention generally relates to jet or rocket engines. More specifically, the present invention relates to a hydrogen gas generator for jet engines that has a photon and ion-producing hydrogen generator for disassociating hydrogen from water in the combustion chamber of a jet engine.

2. Description of the Related Art

The rising cost and diminishing supply of hydrocarbon fuels, e.g., gasoline, have increased the criticality of developing or finding alternative fuels. This is especially true in the commercial and military aviation industry where costly, high quality fuels are required to power the jet engines of commercial freight and passenger airliners and various military aircraft. Furthermore, pollution caused by burning hydrocarbon fuels is suspected of creating and/or contributing to a greenhouse effect in the atmosphere, thereby creating problems that may have a bearing on the future course of human civilization.

The use of hydrogen as a fuel to power engines has been contemplated for many years. Hydrogen is one of the most abundant elements on earth, and combustion of this abundant element produces pollution-free water. Unfortunately, hydrogen is highly volatile and poses many risks when stored in large quantities, thus creating many problems in making the gas available for storage at public airport facilities and on military bases. The art would certainly welcome a device that could safely and efficiently utilize a virtually inexhaustible supply of a common element (hydrogen) to power jet engines that would also result in production of pollution-free byproducts. Thus, a hydrogen gas generator for jet engines solving the aforementioned problems is desired.

SUMMARY OF THE INVENTION

The hydrogen gas generator for jet engines includes a device that utilizes photons, ions, and a catalyst to disassociate hydrogen gas from water. The generated hydrogen gas is directed to the combustion chamber of a jet engine and combined with air therein for burning and powering the jet engine. The device is disposed in the combustion chamber of the jet engine and is connected to a source of electric energy and pressurized water. The electric energy is supplied to an anode and a surrounding cathode. The cathode is designed to glow white-hot and emit photons and heat when an electric current is supplied thereto. The anode is fabricated from a catalytic material and is designed to become red-hot when supplied with radiant energy from the cathode. Water is supplied through a conduit and is converted to superheated steam. The steam is sprayed into contact with the anode and cathode to disassociate hydrogen and oxygen, and the photons emitted by the cathode produce oppositely charged hydrogen and oxygen ions. The hydrogen flows through the cathode and into the engine combustion chamber.

Accordingly, the invention presents a hydrogen gas generator capable of generating hydrogen gas from water and directing the generated gas to the combustion chamber of a jet engine. The invention provides for improved elements thereof in an arrangement for the purposes described that are inexpensive, dependable and fully effective in accomplishing their intended purposes.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
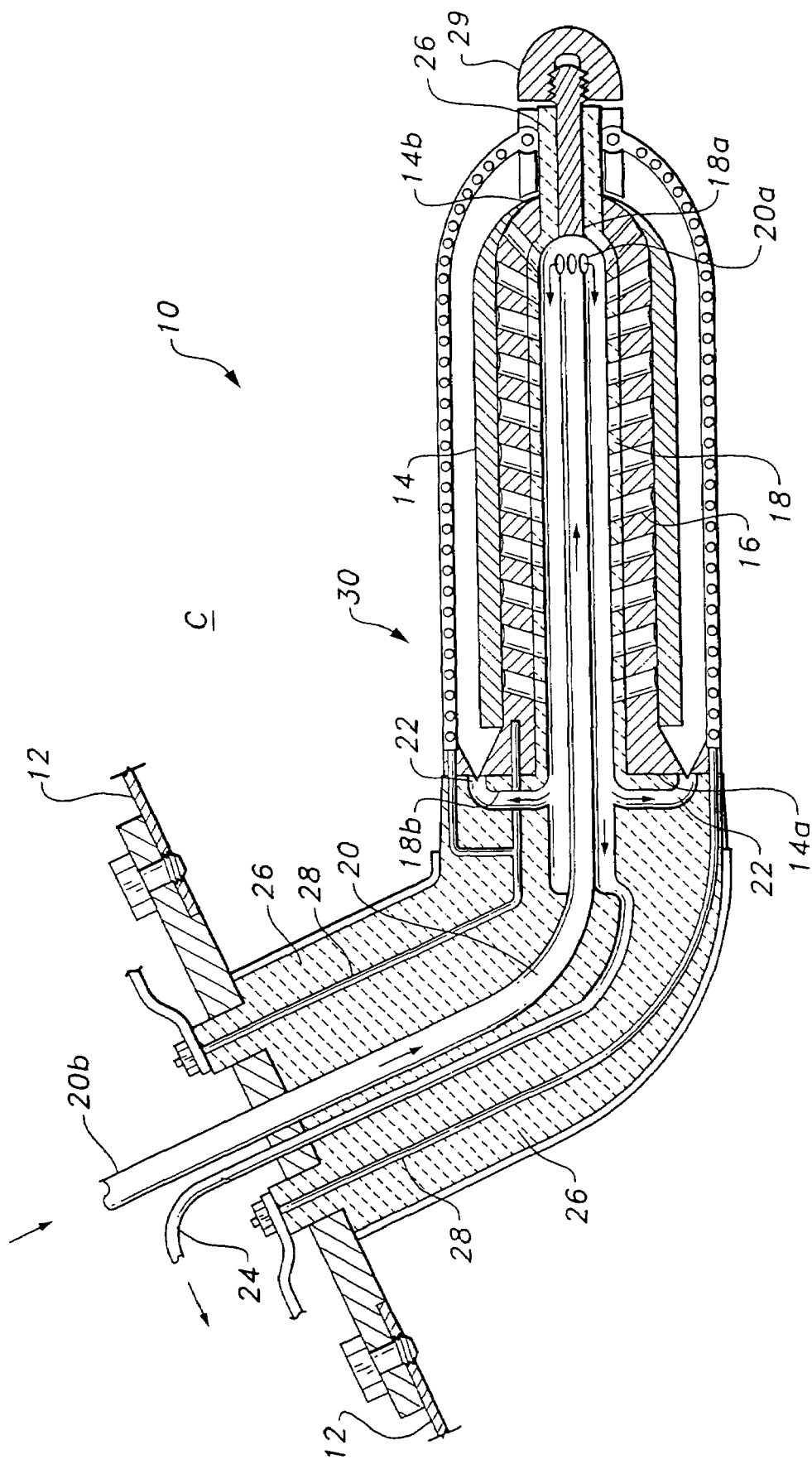
FIG. 1 is a partial section view of a hydrogen gas generator for jet engines according to the present invention, shown mounted in the combustion chamber of a jet engine.
Figure 2:
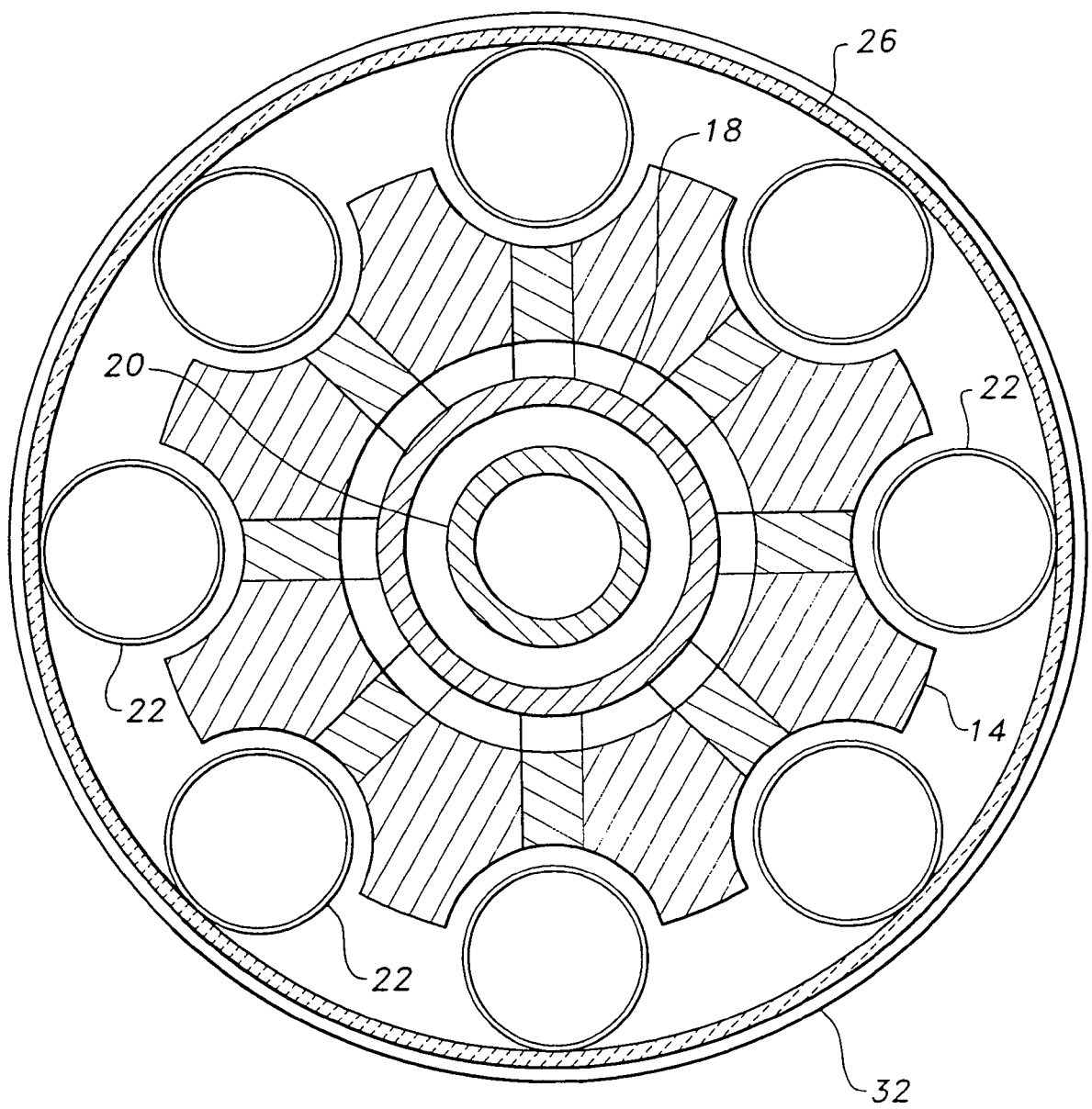
FIG. 2 is an end view in section of a hydrogen gas generator for jet engines according to the present invention.

Attention is first directed to FIGS. 1 and 2, wherein the hydrogen generator of the present invention is generally indicated at 10. Hydrogen generator 10 is mounted through the wall 12 of the combustion chamber C of a jet or rocket engine. The structure and arrangement of the jet engine combustion chamber is conventional and is not part of the inventive concept, per se. Hydrogen generator 10 comprises an array of concentrically arranged, spaced tubular members encapsulated within a screen assembly 30. Outer tubular member 14 is provided with an open proximate end 14a and a closed distal end 14b. A spiral channel 16 is formed on the inner wall of member 14. Member 14 is fabricated from an alloy of carbon steel, iron, nickel and chromium.

A second tubular member 18 is concentrically disposed within member 14. Tubular member 18 has a closed end at 18a adjacent closed distal end 14b of member 14. The opposite end 18b of member 18 is open to receive a pipe 20 concentrically spaced therein. Pipe 20 extends from outside the combustion chamber wall 12 and terminates in an end 20a that opens adjacent closed end 18a of member 18. The opposite end 20b of pipe 20 is connected to a source of pressurized water. As presently contemplated, eight nozzles 22 are evenly arranged in fluid communication with the space between pipe 20 and member 18 for reasons as will be explained below. A starter conduit 24, for supplying superheated steam on start-up to pump air into the combustion chamber, is also in fluid communication with the space between pipe 20 and member 18.

Figure 3:
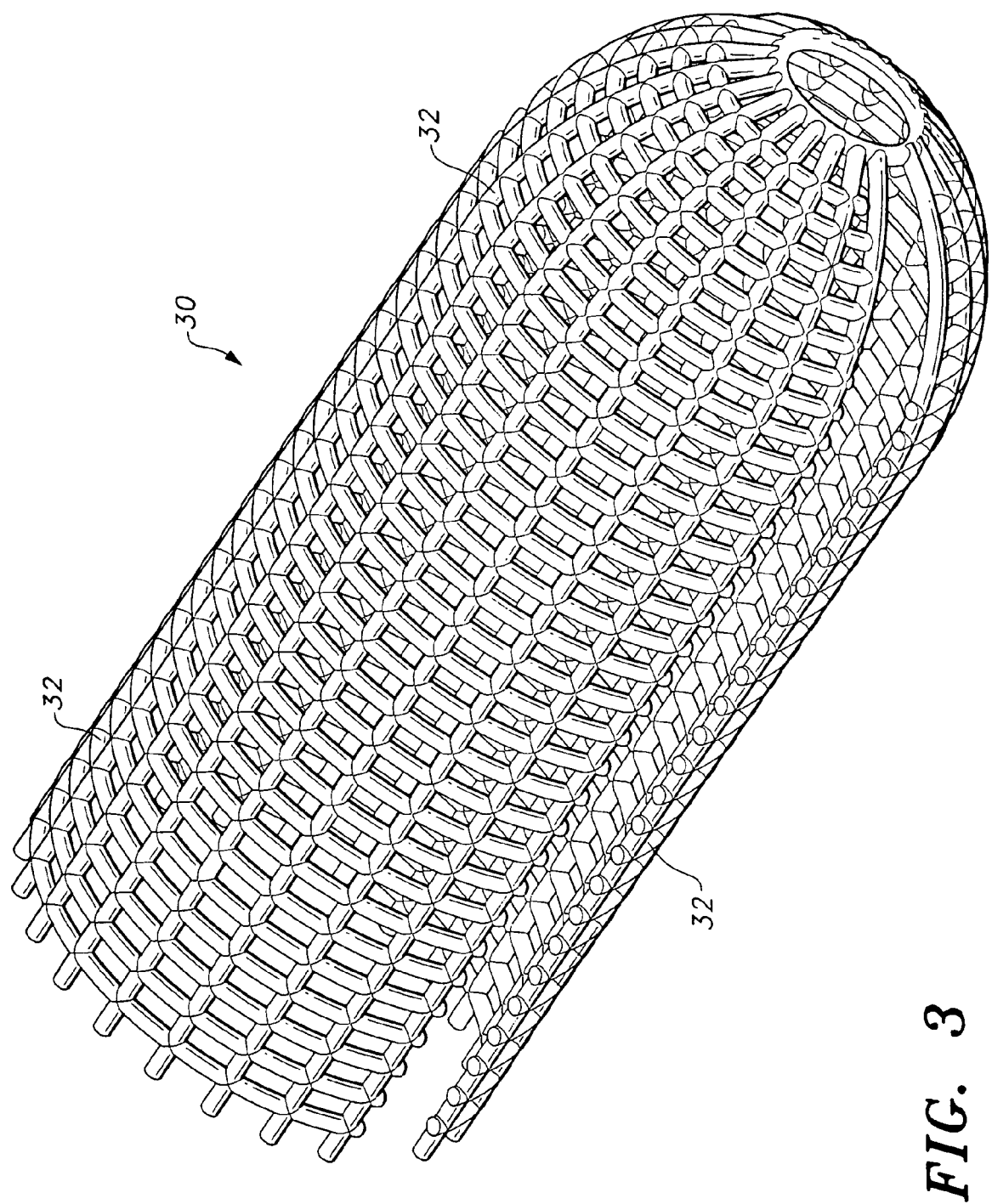
FIG. 3 is a partial, perspective view of a cathode of a hydrogen gas generator for jet engines according to the present invention.

Ceramic insulators 26 are utilized to close and seal the spaces between the tubular members. Electric current is provided to members 14 and 30 via copper wires 28. A nut and bolt assembly 29 permits the generator to be easily disassembled for maintenance. As best seen in FIG. 3, screen assembly 30 is configured as an open metallic mesh and is fabricated from strands of tungsten 32.

In use, electric energy is supplied to the generator via copper wires 28. The polarity of the wires 28 is arranged so that member 14 functions as an anode and member 30 functions as a cathode. The anode 14, because of its metallic content, also functions as a catalyst when heated. The cathode 30 becomes white-hot when supplied with electrical energy and emits photons and generates heat. Pressurized water is supplied to the generator through pipe 20 (note direction of arrows). The anode 14 becomes red-hot, and heat generated by the anode converts the water to superheated steam as it flows through member 18. The superheated steam exits nozzles 22.

The superheated steam is thermolytically converted to hydrogen and oxygen. The photons emitted by the cathode 30 convert the hydrogen and oxygen gases into positively charged hydrogen ions and negatively charged oxygen ions in the space between the anode 14 and the cathode 30. Member 14 (anode) is a positive electrode that functions to attract and remove the oxygen ions from the mixture, and may be made from a catalytic material to increase efficiency of the electrode. The hydrogen gas flows through the white-hot screen 30 into combustion chamber C. The hydrogen gases burn white-hot in the combustion chamber, producing more photons and heat, allowing reduction of the electrical current to cathode 30. A portion of the superheated steam exiting from nozzles 22 enters spiral channel 16 through openings therein to make the superheating process more efficient. Conventional controls, including valves and timers, may be provided to control operation of the device.

The hydrogen gas produced by the generator undergoes combustion in the combustion chamber, which is converted to power by the jet engine in a manner conventional for rocket engines.

It is to be understood that the present invention is not limited to the embodiment described above, but encompasses any and all embodiments within the scope of the following claims.

I claim:

1. A hydrogen gas generator for jet engines, comprising:
   a tubular anode defining an inner space and having an inner surface, the anode having a spiral groove defined in the inner surface;
   a cathode screen filament disposed around the anode and defining a space therebetween, the anode and the cathode being adapted for mounting in a combustion chamber of a jet engine;
   a pipe extending into the inner space of the tubular anode for delivering pressurized water into the inner space, the pressurized water being converted to steam;
   a plurality of nozzles in fluid communication with the inner space and the space between the cathode screen filament and the anode, the nozzles being adapted for delivering the steam from the inner space to the space between the cathode screen filament and the anode; and
   means for supplying sufficient electrical current to the anode to heat pressurized water delivered through the pipe to produce superheated steam.

2. The hydrogen gas generator for jet engines according to claim 1, further including means for supplying sufficient electrical current to said cathode to thermolytically produce hydrogen and oxygen gases from the superheated steam, and to produce photons to ionize the hydrogen and oxygen gases.

3. The hydrogen gas generator for jet engines according to claim 1, wherein said anode has an open proximate end and a closed distal end.

4. The hydrogen gas generator for jet engines according to claim 1, wherein said anode is fabricated from a metal alloy of carbon steel, iron, nickel and chromium.

5. The hydrogen gas generator for jet engines according to claim 1, wherein said cathode is fabricated from strands of tungsten.

6. A hydrogen gas generator for jet engines, comprising:
   a tubular anode defining an inner space, the tubular anode having an inner surface, an open proximate end, a closed distal end, and a spiral groove defined in the inner surface;
   a cathode screen filament disposed around the anode and defining a space therebetween, the anode and the cathode being adapted for mounting in a combustion chamber of a jet engine;
   a pipe extending into the inner space of the tubular anode, the pipe having an open end terminating in the inner space for delivering pressurized water therein, the pressurized water being converted to superheated steam;
   a plurality of nozzles in fluid communication with the inner space and the space between the cathode screen filament and the anode, the nozzles being adapted for delivering the superheated steam from the inner space to the space between the cathode screen filament and the anode; and
   means for supplying sufficient electrical current to the anode to heat pressurized water delivered through the pipe to produce superheated steam.

7. The hydrogen gas generator for jet engines according to claim 6, wherein the open end of said pipe terminates adjacent the closed distal end of said tubular anode.

8. The hydrogen gas generator for jet engines according to claim 6, further including means for supplying sufficient electrical current to said cathode to thermolytically produce hydrogen and oxygen gases from the superheated steam, and to produce photons to ionize the hydrogen and oxygen gases.

9. The hydrogen gas generator for jet engines according to claim 6, wherein said anode is fabricated from a metal alloy of carbon steel, iron, nickel and chromium.

10. The hydrogen gas generator for jet engines according to claim 6, wherein said cathode is fabricated from strands of tungsten.

11. A hydrogen gas generator for jet engines, comprising:
    a tubular anode fabricated from a metal alloy of carbon steel, iron, nickel and chromium, the tubular anode defining an inner space and having an inner surface, an open proximate end, a closed distal end, and a spiral groove defined in the inner surface;
    a cathode screen filament fabricated from strands of tungsten, the cathode screen filament being disposed around the anode and defining a space therebetween, the anode and the cathode being adapted for mounting in a combustion chamber of a jet engine;
    a pipe extending into the inner space of the tubular anode, the pipe having an open end terminating in the inner space for delivering pressurized water therein, the pressurized water being converted to superheated steam;
    a plurality of nozzles in fluid communication with the inner space and the space between the cathode screen filament and the anode, the nozzles being adapted for delivering the superheated steam from the inner space to the space between the cathode screen filament and the anode; and
    means for supplying sufficient electrical current to the anode to heat pressurized water delivered through the pipe to produce superheated steam.

12. The hydrogen gas generator for jet engines according to claim 11, wherein the open end of the pipe terminates adjacent the closed distal end of the tubular anode.

13. The hydrogen gas generator for jet engines according to claim 12, further including means for supplying sufficient electrical current to said cathode to thermolytically produce hydrogen and oxygen gases from the superheated steam, and to produce photons to ionize the hydrogen and oxygen gases.

* * * * *